(12) United States Patent
Mua et al.

(10) Patent No.: US 8,136,533 B2
(45) Date of Patent: Mar. 20, 2012

(54) RECONSTITUTED TOBACCO SHEET AND SMOKING ARTICLE THEREFROM

(75) Inventors: John-Paul Mua, Advance, NC (US); Luis Monsalud, Jr., Kernersville, NC (US)

(73) Assignee: R.J. Reynolds Tobacco Company, Winston-Salem, NC (US)

(*) Notice: Subject to any disclaimer, the term of this patent is extended or adjusted under 35 U.S.C. 154(b) by 929 days.

(21) Appl. No.: 11/860,031

(22) Filed: Sep. 24, 2007

(65) Prior Publication Data

US 2008/0006286 A1 Jan. 10, 2008

Related U.S. Application Data

(60) Division of application No. 10/920,466, filed on Aug. 18, 2004, now abandoned, which is a continuation-in-part of application No. 10/811,270, filed on Mar. 26, 2004, now Pat. No. 7,308,898, which is a continuation-in-part of application No. 10/299,231, filed on Nov. 19, 2002, now Pat. No. 6,827,087.

(51) Int. Cl.
*A24B 3/14* (2006.01)
*A24D 1/00* (2006.01)

(52) U.S. Cl. ......................... 131/358; 131/365

(58) Field of Classification Search ............ 131/365; 162/139
See application file for complete search history.

(56) References Cited

U.S. PATENT DOCUMENTS

| | | | |
|---|---|---|---|
| 1,996,002 A | 3/1935 | Seaman | |
| 1,999,224 A | 4/1935 | Miles | |
| 2,013,508 A | 9/1935 | Seaman | |
| 2,769,734 A * | 11/1956 | Bandel | 131/355 |
| 3,006,347 A * | 10/1961 | Keaton | 131/277 |
| 3,012,914 A | 12/1961 | Battista et al. | |
| 3,030,963 A | 4/1962 | Cohn | |
| 3,118,452 A | 1/1964 | Moshy | |
| 3,165,105 A | 1/1965 | Campbell | |
| 3,180,340 A | 4/1965 | Stedman | |
| 3,185,162 A | 5/1965 | Fiore et al. | |
| 3,411,515 A | 11/1968 | Hind et al. | |
| 3,419,543 A | 12/1968 | Mold et al. | |
| 3,428,053 A | 2/1969 | Schoenbaum et al. | |
| 3,464,422 A | 9/1969 | Light et al. | |
| 3,526,231 A | 9/1970 | Verbakel | |
| 3,540,456 A * | 11/1970 | McGlumphy et al. | 131/337 |
| 3,561,451 A | 2/1971 | Jacin et al. | |
| 3,628,541 A | 12/1971 | Buchmann | |
| 3,667,479 A | 6/1972 | Sanford et al. | |

(Continued)

FOREIGN PATENT DOCUMENTS

DE 19531061 2/1997

(Continued)

*Primary Examiner* — Jason L. Lazorcik (74) *Attorney, Agent, or Firm* — Middleton Reutlinger; Charles I. Sherman (57) ABSTRACT

A smoking article having one or more reconstituted tobacco split inner wrap strips is described. One or more split inner wrap strips extend coaxially along the tobacco column between the inner surface of an outer wrap of cigarette paper and the tobacco column. The tobacco blend includes burley and a second tobacco, such as flue-cured, oriental, Maryland, or rare and exotic tobaccos, and combinations thereof. This blend improves burley smoke character without increasing Hoffman analyte levels, especially tobacco-specific nitrosamines (i.e., TNSAs). A cigarette with an improved burley smoke character without increasing Hoffman analyte levels is also described.

10 Claims, 5 Drawing Sheets

U.S. PATENT DOCUMENTS

| | | | |
|---|---|---|---|
| 3,699,972 A | 10/1972 | Frisch | |
| 3,765,105 A | 10/1973 | Montgomery et al. | |
| 3,773,053 A | 11/1973 | Stephens, Jr. | |
| 3,782,392 A | 1/1974 | Monte | |
| 3,805,799 A | 4/1974 | Stewart, Jr. et al. | |
| 4,002,179 A | 1/1977 | Rundberg et al. | |
| 4,077,414 A | 3/1978 | Baker et al. | |
| 4,109,663 A | 8/1978 | Maeda et al. | |
| 4,119,104 A | 10/1978 | Roth | |
| 4,119,106 A | 10/1978 | Grubbs et al. | |
| 4,146,040 A | 3/1979 | Cohn | |
| 4,174,719 A | 11/1979 | Martin et al. | |
| 4,231,377 A | 11/1980 | Cline et al. | |
| 4,270,552 A | 6/1981 | Jenkins et al. | |
| 4,336,812 A | 6/1982 | Seragnoli | |
| 4,423,553 A | 1/1984 | Miyawaki | |
| 4,452,259 A | 6/1984 | Norman et al. | |
| 4,480,650 A | 11/1984 | Weinert | |
| 4,489,738 A | 12/1984 | Simon | |
| 4,497,331 A | 2/1985 | Nelien | |
| 4,542,755 A | 9/1985 | Selke et al. | |
| 4,561,454 A | 12/1985 | Guess | |
| 4,607,647 A | 8/1986 | Dashley et al. | |
| 4,615,345 A | 10/1986 | Durocher | |
| 4,630,620 A | 12/1986 | Gabriel | |
| 4,666,550 A | 5/1987 | Spiers et al. | |
| 4,739,775 A | 4/1988 | Hampl, Jr. | |
| 4,924,888 A | 5/1990 | Perfetti et al. | |
| 4,936,920 A | 6/1990 | Keritsis et al. | |
| 4,945,932 A | 8/1990 | Mentzel et al. | |
| 4,998,543 A | 3/1991 | Goodman et al. | |
| 5,060,675 A | 10/1991 | Milford et al. | |
| 5,074,321 A | 12/1991 | Gentry et al. | |
| 5,092,353 A | 3/1992 | Montoya et al. | |
| 5,105,838 A | 4/1992 | White et al. | |
| 5,129,408 A | 7/1992 | Jakob et al. | |
| 5,131,416 A * | 7/1992 | Gentry | 131/365 |
| 5,139,034 A | 8/1992 | Chan | |
| 5,143,098 A | 9/1992 | Rogers et al. | |
| 5,144,966 A | 9/1992 | Washington | |
| 5,156,169 A | 10/1992 | Holmes et al. | |
| 5,159,944 A | 11/1992 | Arzonico et al. | |
| 5,161,425 A | 11/1992 | Baskett et al. | |
| 5,169,481 A | 12/1992 | Braunshteyn et al. | |
| 5,178,167 A | 1/1993 | Riggs et al. | |
| 5,191,906 A | 3/1993 | Myracle, Jr. | |
| 5,200,020 A | 4/1993 | Collins et al. | |
| 5,220,930 A * | 6/1993 | Gentry | 131/365 |
| 5,244,530 A | 9/1993 | Collins et al. | |
| 5,261,999 A | 11/1993 | Pinker et al. | |
| 5,271,419 A | 12/1993 | Arzonico et al. | |
| 5,327,917 A | 7/1994 | Lekwauwa et al. | |
| 5,398,702 A | 3/1995 | Belvederi | |
| 5,415,186 A | 5/1995 | Casey, III et al. | |
| 5,417,228 A | 5/1995 | Baldwin et al. | |
| 5,450,863 A | 9/1995 | Colins et al. | |
| 5,462,073 A | 10/1995 | Bowen et al. | |
| 5,474,095 A | 12/1995 | Allen et al. | |
| 5,534,114 A | 7/1996 | Cutright et al. | |
| 5,598,868 A | 2/1997 | Jakob et al. | |
| 5,601,097 A | 2/1997 | De Grandpre et al. | |
| 5,692,526 A | 12/1997 | Adams et al. | |
| 5,699,812 A | 12/1997 | Bowen et al. | |
| 5,765,570 A | 6/1998 | Litzinger et al. | |
| 5,820,998 A | 10/1998 | Hotaling et al. | |
| 5,845,649 A | 12/1998 | Saito et al. | |
| 5,878,753 A | 3/1999 | Peterson et al. | |
| 5,878,754 A | 3/1999 | Peterson et al. | |
| 5,997,691 A | 12/1999 | Gautam et al. | |
| 6,129,087 A | 10/2000 | Wallace et al. | |
| 6,142,154 A | 11/2000 | Dall'Osso et al. | |
| 6,198,537 B1 | 3/2001 | Bokelman et al. | |
| 6,289,897 B1 | 9/2001 | McAdam et al. | |
| 6,298,858 B1 * | 10/2001 | Coleman et al. | 131/290 |
| 6,325,859 B1 | 12/2001 | Roos et al. | |
| 6,502,613 B2 | 1/2003 | Suzuki | |
| 6,511,012 B2 | 1/2003 | Hermanns et al. | |
| 6,606,999 B2 * | 8/2003 | Crooks et al. | 131/365 |
| 6,705,325 B1 | 3/2004 | Hicks et al. | |
| 6,827,087 B2 | 12/2004 | Wanna et al. | |
| 6,860,274 B2 | 3/2005 | Matsufuji et al. | |
| 6,874,508 B2 | 4/2005 | Shafer et al. | |
| 6,908,874 B2 | 6/2005 | Woodhead et al. | |
| 6,929,013 B2 | 8/2005 | Ashcraft et al. | |
| 7,051,739 B2 | 5/2006 | Wanna et al. | |
| 7,073,514 B2 | 7/2006 | Barnes et al. | |
| 7,428,905 B2 | 9/2008 | Mua | |
| 2004/0099279 A1 | 5/2004 | Chapman et al. | |
| 2004/0118420 A1 | 6/2004 | Barnes et al. | |
| 2004/0129281 A1 | 7/2004 | Hancock et al. | |
| 2004/0134631 A1 | 7/2004 | Crooks et al. | |
| 2004/0177856 A1 | 9/2004 | Monsalud, Jr. et al. | |
| 2004/0261805 A1 | 12/2004 | Wanna et al. | |
| 2005/0005947 A1 | 1/2005 | Hampl, Jr. et al. | |
| 2005/0016556 A1 | 1/2005 | Ashcraft et al. | |
| 2005/0039767 A1 | 2/2005 | Mua et al. | |
| 2005/0056294 A1 | 3/2005 | Wanna et al. | |
| 2005/0066986 A1 | 3/2005 | Nestor et al. | |
| 2005/0076929 A1 | 4/2005 | Fitzgerald et al. | |

FOREIGN PATENT DOCUMENTS

| | | |
|---|---|---|
| EP | 483998 | 5/1992 |
| EP | 565360 | 10/1993 |
| EP | 1050223 | 11/2000 |
| GB | 973681 | 11/1962 |
| GB | 1306054 | 2/1973 |
| JP | 3264109 | 11/1991 |
| WO | 0108514 | 8/2001 |
| WO | 0237991 | 5/2002 |
| WO | 0244700 | 6/2002 |
| WO | 02055294 | 7/2002 |
| WO | 03043450 | 5/2003 |
| WO | 2004045320 | 6/2004 |
| WO | 2005039326 | 5/2005 |
| WO | 2005096850 | 10/2005 |

* cited by examiner

RECONSTITUTED TOBACCO SHEET AND SMOKING ARTICLE THEREFROM

CROSS-REFERENCE TO RELATED APPLICATIONS

This divisional application claims priority to and benefit from currently pending U.S. application Ser. No. 10/920,466, filed Aug. 18, 2004, which is a continuation-in-part application that claims priority to and benefit from currently pending U.S. application Ser. No. 10/811,270, filed Mar. 26, 2004, which is a continuation-in-part application that claims priority to and benefit from U.S. application Ser. No. 10/299,231, filed Nov. 19, 2002, now U.S. Pat. No. 6,827,087, issued on Dec. 7, 2004, which are incorporated herein by reference.

BACKGROUND OF THE INVENTION

The present invention relates to a process for making a reconstituted tobacco sheet and more particularly to a process for making a bandcast reconstituted tobacco sheet having burley, flue-cured, oriental, Maryland, rare and exotic tobaccos, and combinations thereof, contained in a gel matrix within the reconstituted tobacco sheet. Even more particularly, the tobacco sheets having burley, as well as flue-cured, oriental, Maryland, rare and exotic tobaccos, and combinations thereof, are slit into split inner wrap strips which are positioned within the tobacco rod's wrapper. Exotic tobaccos include, but are not limited to, Izmar, Sumsun, Yaka, Latakia, Perique, Cavendish, Rustica, Fire-cure, and Dark or Sun-cure.

In the manufacturing of smoking articles and particularly cigarettes, it is common to use in the tobacco strip blend a percentage of strips of reconstituted tobacco. The reconstituted tobacco is generally prepared from tobacco fines, veins, stems and other waste tobacco products which are further processed and formed into sheets, cut into strips and blended in with fresh cut tobacco. The amount of reconstituted tobacco used in a tobacco blend for a smoking article varies, but is generally less than 20%. Usually these reconstituted tobacco sheets are absent of additional flavoring compounds as it has been found that the flavoring compounds, such as menthol, evaporate or dissipate rapidly from the sheet prior to blending with other tobacco and therefore provide little to no additional flavoring benefit to the tobacco blend.

Additionally, there has been great concern for the reduction of the ignition propensity of smoking articles as there have been a substantial number of fires which have been attributed to burning cigarettes coming into contact with combustible or flammable materials. Therefore, there is a considerable effort being expended in the industry to provide smoking articles which provide a low ignition propensity smoking article. Many of these proposals include a modification of the wrapper for the smoking article. Particularly, coatings or additives have been made to wrappers for the smoking articles to reduce the porosity or to change the chemical properties of the wrapper.

SUMMARY OF THE INVENTION

In view of known deficiencies associated with earlier smoking articles, a smoking article having reconstituted tobacco comprised of burley tobacco, as well as a second tobacco, such as flue-cured, oriental, Maryland, rare and exotic tobaccos, and combinations thereof, in the form of split inner wrap strips, is provided. The rare and exotic tobaccos may include, but are not limited to, Izmar, Sumsun, Yaka, Latakia, Cavendish, Rustica, Fire-cure, and Dark or Sun-cure. The split inner wrap strips constitute less than 9% of the total tobacco strip blend, but deliver a better smoke flavor, lower the ignition propensity, and increase puff number.

It is an object of the present invention to provide a novel formulation for a bandcast reconstituted tobacco sheet and the process for making same.

It is an object of the present invention to provide a reconstituted sheet made of rare and exotic tobaccos, of limited supply, to provide unique smoke flavors.

It is also an object of the present invention to provide a smoking article, including a novel bandcast reconstituted tobacco sheet in one layer of a wrapper for the smoking article.

It is an object of the present invention to provide a smoking article including a burley skewed reconstituted tobacco sheet that provides a better tobacco smoke characteristic but minimizes TSNA formation.

The present invention provides a bandcast tobacco sheet which may include from about 30 to about 80% by weight of tobacco blend, from about 5 to about 40% weight of wood pulp, from about 8 to about 40% by weight of binder, and up to about 30% by weight of a flavoring compound, such as menthol. The tobacco blend is comprised of at least about 30% burley by weight and up to about 30% by weight of a second tobacco. The binder may be alginate (e.g., sodium alginate), guar, xanthum, acacia, pectin, other gums, modified cellulose compounds, and hydrocolloid compounds. The bandcast tobacco sheet can also include from about 8 to about 30% by weight of humectants, such as glycerin or propylene glycol.

The present invention also provides a process for making a bandcast tobacco sheet which includes as a first step of making a slurry including tobacco, wood pulp, binder and menthol. The prepared slurry is cast onto a movable band or screen and subsequently dried to form a sheet of reconstituted tobacco. The resulting tobacco sheet is cut into lengths of preselected widths for use in a smoking article. In one embodiment, the strips are positioned longitudinally of the tobacco rod between the tobacco rod and an outer cigarette or smoking article wrapper.

In preparing the bandcast material, the wood pulp and binder, particularly an alginate, such as sodium alginate, are added for sheet strength and binding of the ingredients into the tobacco sheet. A humectant, such as glycerin, may also be added for sheet pliability in addition to any desired flavorants, such as, menthol, as well as other fillers, such as calcium carbonate. The proportion of the materials varies and is dependent upon end uses. However, in a preferred sheet, the amount of tobacco in the mixture is usually approximately the same as the binder, such as sodium alginate, but the tobacco may exceed the alginate by 10 to 20% by weight.

The present invention also provides for bandcast tobacco sheets having not only burley, but a second tobacco, such as flue-cured, oriental, Maryland, or rare and exotic tobaccos, and combinations thereof, and a method for preparing same. The rare and exotics include, but are not limited to, Izmar, Samsun, Yaka, Latakia, Perique, Cavendish, Rustica, Fire-cure, and Dark or Sun-cure.

Since burley tobacco, for example, is high in tobacco specific nitrosamines (TSNAs), burley inclusion levels for potentially reduced exposure products, are limited to less than the normal 25% to 40% inclusion levels, for US blended cigarettes. The use of less burley outside the norm results in poor balance tobacco smoke character. Smoke TSNAs formation or transfer is minimized via split inner wrap technology. Such technology involves the use of one or more strips of burley or burley skewed reconstituted tobacco sheets aligned longitudinally and adjacent each other on the periphery of a cigarette's tobacco column, just inside the cigarette outer wrap paper.

Using burley bandcast reconstituted tobacco split inner wrap strips provides unique properties to cigarettes, such as lowering ignition propensity, improving smoke flavor, and increasing cigarette puff count while minimizing TSNA levels. With respect to sensory improvement, since combustion takes place preferentially towards the periphery or surface of the cigarette rod, most of the smoke products formed should be transferred to the mainstream smoke. Since cigarette burn temperature are generally lower on the outside of the rod and hotter within the core, the outer positioning of the split inner strip enables it to produce lesser chemical compounds than tobacco within the core, therefore, the split inner wrap contributes less to mainstream smoke Hoffman analyte (HA) deliveries. Hence, the use of burley tobacco to make reconstituted tobacco split inner wrap strips to insert into cigarette rods improves burley's smoke character, optimizes taste impact, and minimizes mainstream Hoffman analyte deliveries.

The present invention further provides for a smoking article including burley reconstituted tobacco split inner wrap strips. The split inner wrap could be made via bandcast, paper, or extrusion reconstituted tobacco technology. Note also, that the present invention provides for split inner wrap strips made not only with burley, but also with flue-cure, oriental, Maryland, or combinations thereof, with the optional addition of casings and flavorings. Also, certain exotic and rare flavorful tobaccos, not in enough supply to be in commercial use (e.g., Izmar, Samsun, Yaka, Latakia, Perique, Cavendish, Rustica, Fire-cure, and Dark or Sun-cure), can be used.

Additional objects and advantages of the present invention will become apparent to those skilled in the art upon consideration of the following detailed description including examples of the preparation of the bandcast reconstituted tobacco sheet of the present invention.

DETAILED DESCRIPTION OF THE PREFERRED EMBODIMENTS

Figure 1:
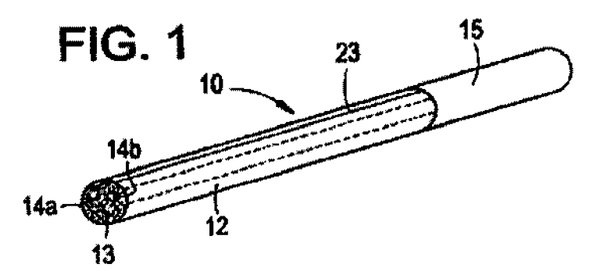
FIG. 1 is a perspective view of a partial cigarette of the present invention using the reconstituted tobacco bandcast sheet of the present invention.

A cigarette with burn rate modification is shown in FIG. 1 and may be described as a partial double wrap cigarette 10. The tobacco can be burley, flue-cured, oriental, Maryland, rare and exotic tobaccos, and combinations thereof As seen therein, the partial double wrap cigarette 10 of the present invention incorporates a standard column of tobacco 13 which extends from an exposed end to the filter 15. Circumscribing the tobacco column 13 is the outer wrap of the cigarette paper 12. Interior of the outer wrap cigarette paper 12 is a separate partial inner wrap layer or strip 14a and 14b. The separate partial inner wrap layer 14a and 14b acts as a burn rate modifier for the tobacco column 13 by altering the burn characteristics of the cigarette 10. As can be seen from the embodiment shown in FIG. 1, the inner wrap layer strips may be co-axial to the tobacco column 13 and may extend substantially the length of the tobacco column from the exposed end to the filter 15. By insertion of the separate partial inner wrap layer 14a and 14b which in this embodiment extends co-axial to the tobacco column 13, modification may be made to the burn rate of the cigarette in such a manner that the burn rate may be adjusted depending upon the packing density of the tobacco, porosity of the outer wrap paper 12 and additives to the outer wrap, width of the separate partial inner wrap layer 14a and 14b, porosity of the inner wrap layers 14a and 14b, and additives to the inner wrap strips. Alternatively, the inner wrap layer may be shortened to not extend the full length of the tobacco column 13 or may extend in varying directions. Thus, many alterations to the burn rate of the partial double wrap cigarette 10 of the present invention may be established based upon the combination of factors noted herein, among others.

As depicted in FIG. 1, the partial double wrap cigarette 10 of the present invention which has a modified burn rate characteristic incorporates an outer wrap paper 12 with a first and a second separate partial inner wrap strip 14a and 14b. The outer wrap cigarette paper 12 may be a normal porosity paper which typically exhibits a porosity of 15-80 CORESTA units. In combination with the outer wrap cigarette paper 12 is positioned at least one partial inner wrap layer which can modify the burn rate characteristics of the cigarette 10. As shown, a first and a second partial inner wrap layer 14a and 14b are provided on opposite sides of the tobacco column 13. In order to provide substantially equivalent burn rate characteristics along the entirety of the tobacco column 13, the partial inner wrap strips 14a and 14b may substantially extend and be co-axial with the tobacco column 13 to the filter 15.

Figure 4:
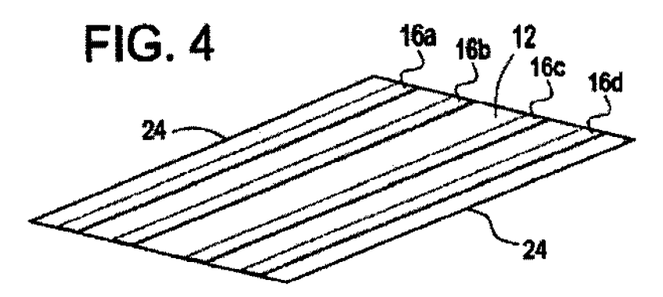
FIG. 4 is a perspective view of the cigarette wrapper of the present invention including strips of the bandcast reconstituted tobacco sheet.

As depicted in the embodiment of FIG. 4, the partial inner wrap layers 14a and 14b extend from end to end of the tobacco column 13 and may be positioned such that they are either equal distant from each other or may be placed in alternative positions based upon the desired burn rate characteristics.

Figure 3:
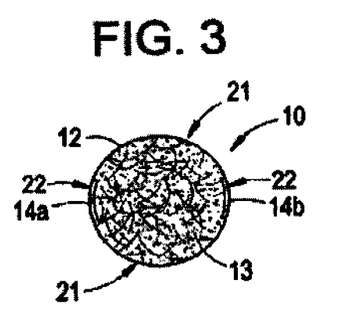
FIG. 3 is an end view of the cigarette of FIG. 1.

Turning to FIG. 3, it is apparent that the partial double wrap cigarette 10 of the present invention has alternating high diffusion areas 21 and low diffusion areas 22 based upon the placement of the inner wrap layers or strips 14a and 14b. As can be seen, the high diffusion areas 21 of which there is at least one, allow for increased permeation of CO and oxygen gases through the barrier formed by the outer wrap 12 while maintaining normal deliveries. In combination, low diffusion areas 22 which are defined by the circumferential extent of each of the partial inner wrap layers 14a and 14b may potentially block a significant portion or all of the inflow and outflow of gases therethrough related directly to the porosity of the inner wrap layer 14a and 14b in combination with the outer wrap layer 12. The co-linear zones of high diffusion area 21 and low diffusion area 22 may exhibit a porosity of greater than 14 CORESTA for the co-linear high diffusion areas and less than 8 CORESTA for the co-linear low diffusion areas.

Figure 2:
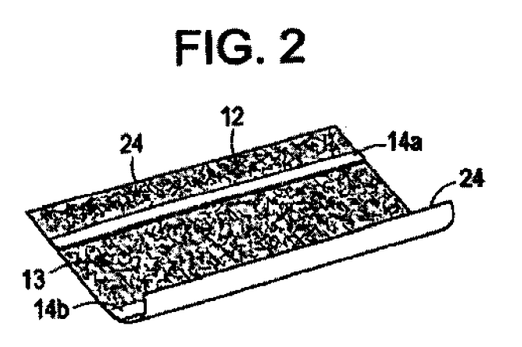
FIG. 2 is a perspective view of an unrolled cigarette wrapper including strips of the bandcast reconstituted tobacco sheet of the present invention.

As shown in the drawings, the construction of the cigarette with burn rate modification is a partial double wrap cigarette 10 depicted herein and utilizes a standard outer wrap cigarette paper 12 which, in a typical cigarette, is 27 mm wide. Placed along the interior of the outer wrap, as shown in FIG. 2 and in FIG. 4 in an alternative embodiment, is located the separate partial inner wrap layer 14a and 14b which may substantially extend along the length of the outer wrap 12. While the outer wrap of the cigarette paper may be standard porosity and construction, the partial inner wrap of this embodiment has a first and a second strip 14a and 14b each of which may be 4 mm in width and which may have a porosity of less than 8 CORESTA units. Therefore, combined, the two inner wrap layers or strips 14a and 14b may circumscribe about 8 mm of the circumference of the partial double wrap cigarette 10 of the present invention but may extend around a circumference of up to 15 mm of the tobacco column in relation to a standard cigarette dimension. Any combination of the partial inner wrap and outer wrap may work depending on the variables noted, such as porosity of each paper, but it is felt that good burn rate characteristics as well as limited effects to smoke characteristics and flavor may be achieved by incorporating an inner wrap which covers less than about 75% or preferably less than about 60% and even more preferably less than about 35% of the circumference of the outer wrap. This is a function of the overall cigarette and may vary depending on the circumference of the outer wrap. However, variations are available to achieve the same favorable results utilizing the inventive aspects of the present design and such descriptions are not felt to be limiting and are exemplary only. Furthermore, even though two strips are shown, it is realized that a plurality of strips may be used when appropriate.

Alternatively, many different constructions may be utilized to provide the cigarette with burn rate modification as set forth herein. As may be understood, a single inner wrap layer or a plurality of inner wrap layers may be provided based upon the desired characteristics and burn rate modification. Thus, as previously mentioned, combinations of low porosity inner wrap segments and higher porosity outer wrap segments may be utilized to provide various linear burn rates which may be desirable. Thus, a typical linear burn rate of 6.0 mm per minute may be reduced as desired based upon a combination of porosity of outer wrap and partial inner wrap strips among other factors and may readily be reduced to below 4 mm/minute if needed. This includes formulation of single inner wrap strips of lower porosity or replacement of the inner wrap strips with various construction material including reconstituted tobacco, low porosity paper, bandcast tobacco, a polymer based material, other paper or material. The inner wrap strips may be coated with burn modifiers or other materials which would create at least one low diffusion area along the tobacco column. The paper may be coated with, as an example, sodium alginate as a burn inhibitor in order to decrease the porosity of the paper and provide adequate characteristics such that the entire combination of outer wrap porosity, tobacco packing density, inner wrap circumference covered and number of strips, inner wrap porosity and other factors cause the cigarette to exhibit a desired burn rate.

As shown in FIGS. 4-7, various embodiments may be utilized in order to create the low porosity zone. As depicted in FIG. 4, the opened standard outer wrap 12 is lined with a plurality of inner wrap or inner layer strips 16a, 16b, 16c and 16d. These strips may be placed equidistantly apart along the interior of the outer wrap 12 and positioned away from the edges or seam where the outer wrap is adhered to itself during rolling within the garniture of the cigarette maker. As depicted, the strips 16a-16d may all be fed into the garniture and incorporated on the interior of the outer wrap adjacent the tobacco column. Placement of the partial inner wrap strips modifies the burn rate to a desired level such that the rate may be decreased sufficiently to cause either a significantly reduced static burn rate or self-extinguishment at a desired interval.

Figure 5:
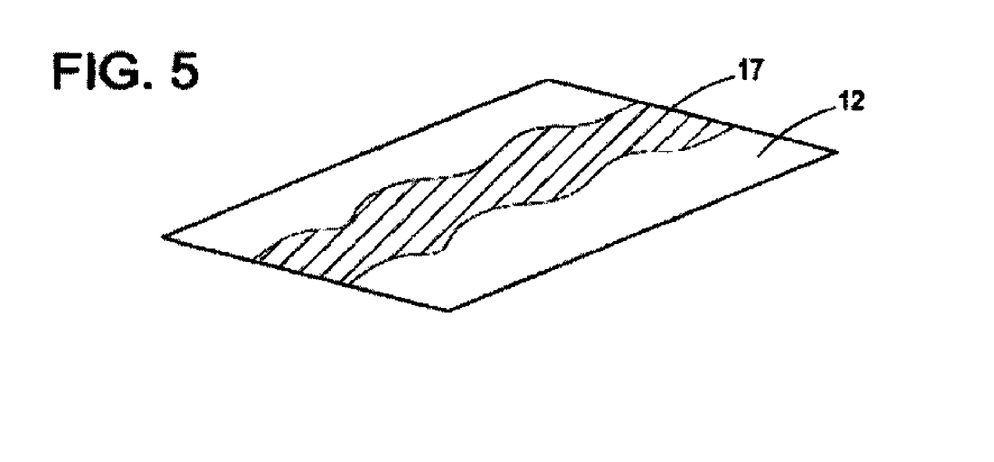
FIG. 5 is a perspective view of a partial inner wrap with non-linear sides.

As shown in FIG. 5, an inner layer with non-linear sides 17 as compared to the edges of the outer wrap 12 may be utilized as the partial inner wrap in order to create the low porosity zone. As shown therein, the inner wrap layer 17 may have be in wave form so that the placement of the low porosity zone changes in position along the tobacco column axis. Such non-linear placement of the low porosity zone may allow for different positioning of the cigarette during static burn and insure that the desired static burn rate takes effect regardless of the position of the cigarette.

Figure 6:
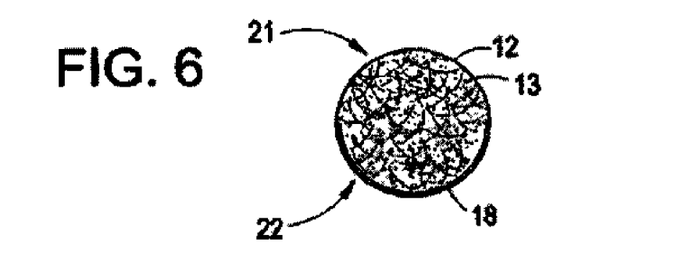
FIG. 6 is a front view of an alternative embodiment for the cigarette with burn rate modification of the present invention.

Depicted in FIG. 6 is another embodiment of the cigarette with burn rate modification of the present invention. As seen therein, a high diffusion area 21 and low diffusion area 22 is defined by addition of a partial double wrap inner wrap layer 18 which circumscribes a portion of the tobacco column 13 on the interior of outer wrap 12. The partial inner wrap layer 18, as depicted in the figure, extends approximately half way around the perimeter of the tobacco column 13. However, many different configurations may be utilized in order to achieve the appropriate linear burn rate through the burn rate modification set forth. The partial double wrap inner wrap layer 18 may be comprised of standard cigarette paper which has a low porosity of less than 7 CORESTA units or cigarette paper coated with burn rate modifiers, or may be alternative construction such as a bandcast tobacco sheet with or without additives and which typically has a low CORESTA unit value, typically less than 5 and more preferably less than 3. A secondary benefit of utilizing bandcast or reconstituted tobacco sheets as the partial double wrap inner wrap layer 18 is that the coloring of the inner wrap may be such that it is similar to the tobacco column 13 and does not provide a contrastly whitened area which extends along the low diffusion area 22. Additionally, a polymer film or other material may be used as the partial double wrap inner wrap layer 18. It may be preferable for the partial double wrap inner layer displayed in FIG. 6 to be 2-14 mm in width or alternatively, less than 75% of the circumference of the outer wrap in order to obtain the appropriate burn rate modification desired wherein the linear burn rate is sustained at a low enough level, preferably below 4.0 mm per minute.

Figure 7:
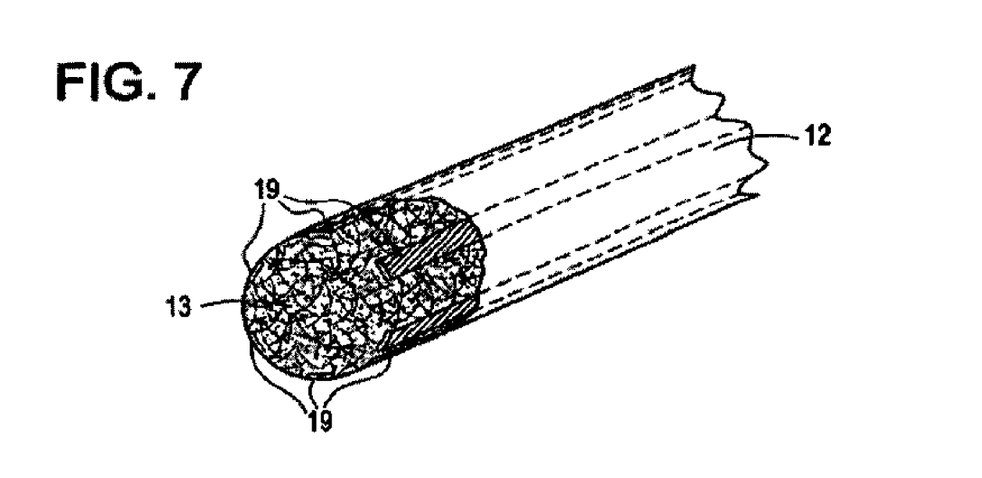
FIG. 7 is a partial cut away view for an alternative embodiment of the cigarette with burn rate modification of the present invention.

As depicted in FIG. 7, an alternative embodiment is disclosed wherein a plurality of inner wrap strips 19 are utilized substantially surrounding the tobacco column 13 on the interior of the outer wrap 12. The plurality of inner wrap strips 19 may be fed into the garniture adjacent the outer wrap 12 and encircling the tobacco column 13 as it is formed within the cigarette maker. The plurality of strips 19 may be comprised of a low porosity cigarette paper individually fed into the cigarette maker or by a single or multiple strips fed into the cigarette maker adjacent to the garniture and cut to the appropriate strip widths. As depicted in FIG. 7, a plurality of inner wrap strips 19 are utilized and extend co-axially substantially along the length of the tobacco column 13. Preferably, the plurality of strips 19 extend along the entire tobacco column length such as to modify the burn rate along the entire tobacco column regardless of cigarette positioning. It is felt that by providing a plurality of strips 19 as depicted in FIG. 7, a more even modification of the burn rate of the cigarette may be produced.

As may be appreciated, extending the inner wrap layer substantially along the length of the tobacco column 13 such that they are co-axial provides a significant benefit over alternating rings which are perpendicular to the axis of the tobacco column 13. Such perpendicular rings which alternate along the length of the tobacco column may provide a non-linear burn rate of the tobacco column 13. Thus, in such a design where there are circumscribing rings around the tobacco column, the linear burn rate becomes variable between a low linear burn rate to a high linear burn rate depending upon the porosity of the paper at the point of the rings as opposed to the porosity of the non-adjusted paper between the rings. Such non-linear burn rate may in fact be undesirable in that continued free burning of the tobacco column between the rings for significant periods of time does not produce an appropriate burn rate modification which can be depended upon through the entire tobacco column length. Further, at points where the low porosity rings are present, a smoker may puff on the cigarette as the burning of the tobacco column passes over a low porosity ring. At such a point, it is thought that the deliveries of the cigarette may be altered significantly to increase the CO and other compounds provided as the cigarette burns over one of these rings. Thus, the partial double wrap inner layer of the present invention overcomes these problems by providing known standard deliveries over the entire length of the tobacco column while also modifying the burn rate along the entire co-axial length.

In the design of the cigarette with the burn rate modification 10 of the present invention, it may be desirable to incorporate the inner wrap layers, whether a plurality of strips or a single layer, away from the seam of the outer wrap 12. As is known in cigarette manufacturing, the seam 23, depicted in FIG. 1, is formed by the maker by over-wrapping the side edges 24 of the outer wrap 12. In typical cigarette manufacturing, an adhesive is applied along one of the edges 24 prior to folding of the outer wrap and formation of the tobacco column 13. During manufacturing of the cigarette with burn rate modification 10 of the present invention, it is desirable to maintain the partial inner wrap layer away from the seam portion to assure that the outer wrap 12 is properly formed and the partial inner wrap layer does not intercede in the formation of the tobacco column or adhesive of the outer wrap layer. Thus, as depicted in the embodiments, the partial inner wrap layers are shown to be placed away from the side edges 24 so that the inner wrap portions will not interfere with the seam of the outer wrap 12 nor interfere with the formation of the tobacco column within the garniture in a typical cigarette manufacturing machine. Thus, the cigarette with burn rate modification of the present invention may be implemented on standard cigarette making machines with only minor modifications made to the paper feeding devices and no modifications therefore will necessarily be required within the garniture. It is also apparent that in any of the embodiments shown herein the strips may be alternatively placed on the exterior of the cigarette and retained on the wrapper by adhesives or other means so that there are still formed co-linear zones of high and low porosity.

Figure 8:
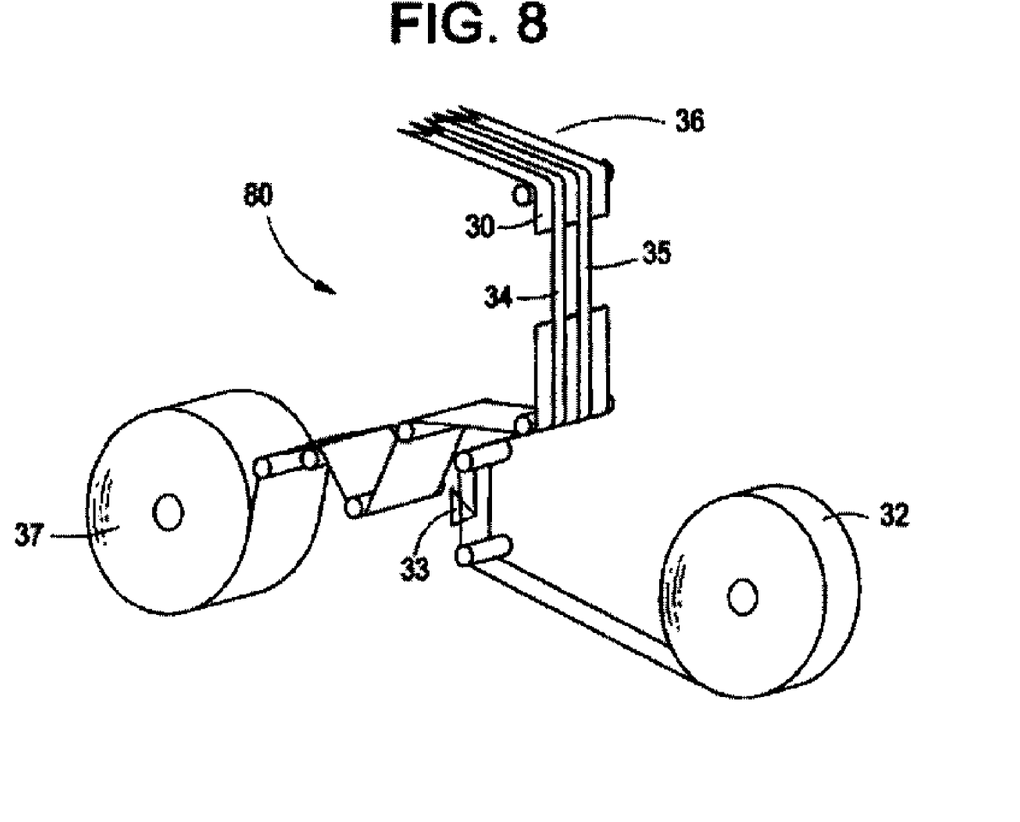
FIG. 8 is a perspective view of the cigarette paper feeder on a cigarette making machine for use with the present invention.

As shown in FIG. 8, a sample design for manufacturing a cigarette with burn rate modification described herein is depicted. The paper feeding assembly 50 is comprised of two paper sources, the outer wrap bobbin 37 and the inner wrap or inner strip bobbin 32. The outer wrap bobbin 37 may be comprised of standard porosity outer wrap cigarette paper having a standard width which may vary between 19-27 mm as may be normally the case and may be fed to the cigarette making machine through a plurality of rollers and tensioning guides. In the embodiment shown, the partial inner wrap and outer wrap layer may be combined to form a combined cigarette paper 36 wherein the outer wrap and inner wrap layer receive the tobacco within the garniture. The outer wrap layer 30 may underlie the partial inner wrap strips 34, 35 which are fed from the inner wrap strip bobbin 32 or other source. The inner wrap strip bobbin 32 may be narrower than the outer wrap as it is intended to cover only a portion of the inner surface of the outer wrap 30. The inner wrap strip bobbin 32 may be unrolled and fed through rollers and cut by a knife into the desired strips prior to forming the combined cigarette paper 36 just preceding the garniture. The strips 34, 35 which form the inner wrap portion of the cigarette of the present invention may have significantly different burn rate characteristics than the outer wrap 30. Thus, variations in the porosity, content and other characteristics may be provided by supplying dual bobbins at the machine in the present embodiment 50. The slitter 33 may be provided to slit the inner wrap paper into two or more strips.

As shown in FIG. 8, the inner wrap strip bobbin 32 may have a paper with a width of 4-15 mm which is slit in two strips. The correct combination of porosity and burn characteristics of the inner wrap and outer wrap layer may be adjusted so as to produce an appropriate burn rate modification which is desirable to produce a standard linear burn rate throughout the entirety of the cigarette and tobacco column.

As shown in FIG. 8, the paper feeding assembly 50 disclosed incorporates a number of tensioning rollers for providing adequate feeding of the outer wrap 30 and the partial inner wrap strips 34, 35 to produce the combined cigarette wrapping paper 36. As may be appreciated, the smaller width bobbin 32 creates significantly more problems in feeding the slit paper to the garniture. Adequate tensioning of the strips 34, 35 must be provided in order to prevent tearing of the inner wrap strips 34, 35 prior to the garniture. Additionally, as cigarette manufacturing process is inherently a stop and go procedure, the proper tensioning of the outer wrap bobbin 37 and inner wrap strip bobbin 32 is necessary. Thus, the partial inner wrap strips 34, 35 may be combined with the outer wrap paper 30 just prior to the garniture or may be combined, as depicted in FIG. 8, immediately after slitting in order to provide proper tensioning and combination of the two layers.

Figure 9:
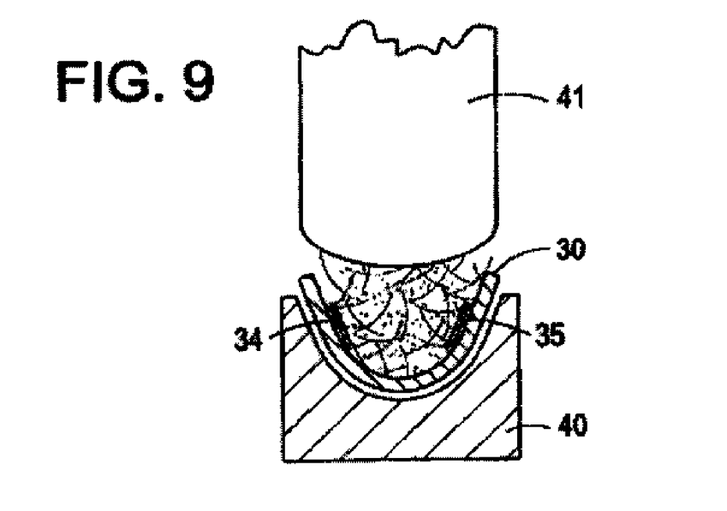
FIG. 9 is an end sectional view of the garniture area of a cigarette making machine for use with the present invention.

Turning to FIG. 9, a cross section of the garniture within the cigarette maker is shown. The garniture 40 is the area within the cigarette maker wherein the cigarette is rolled and formed. There is usually a belt which lies between the outer wrap 30 and the garniture 40 but which is not shown herein for explanation purposes. As depicted, the garniture 40 has a curvature for formation of the tobacco column and cigarette. The curvature folds the outer wrap 30 around the tobacco after the tobacco is deposited by the tobacco provider 41 within the cigarette maker. Prior to entry within the garniture, the inner wrap strips 34, 35 are mated with the outer wrap 30 so that the combined cigarette wrapper 36 is folded and formed with the tobacco while the cigarette wrapper formation is already in place. Such a design allows for the flexibility of combining various characteristics of the outer wrap layer and the partial inner wrap layer. Another benefit of the inline formation and processing of the cigarette with burn rate modification of the present invention is that it is an online method which does not affect the speed or formation of the actual cigarette. Thus, within the garniture, there is no significant modification required to form the cigarette rod which is cut into proper length and then added to filters at a later station within the cigarette maker.

As shown in FIG. 9, the inner wrap strips 34, 35 are fed into the garniture on the interior surface of the outer wrap 30 such that they are in proper placement when the cigarette maker forms the cigarette and tobacco column. In the present example, as shown in FIG. 3, the inner wrap strips 34, 35 are positioned at 90° from the seam of the outer wrap 30 and may be placed equidistant from each other in order to provide a smooth and continuous burn rate modification for the cigarette. The inner wrap material may be placed on the interior side of the outer wrap 30 without adhesive as preferred but other position maintaining material may be used. Formation of the cigarette within the garniture 40 and compacting of the tobacco into the tobacco rod maintains the placement of the inner wrap strips 34, 35.

Figure 10:
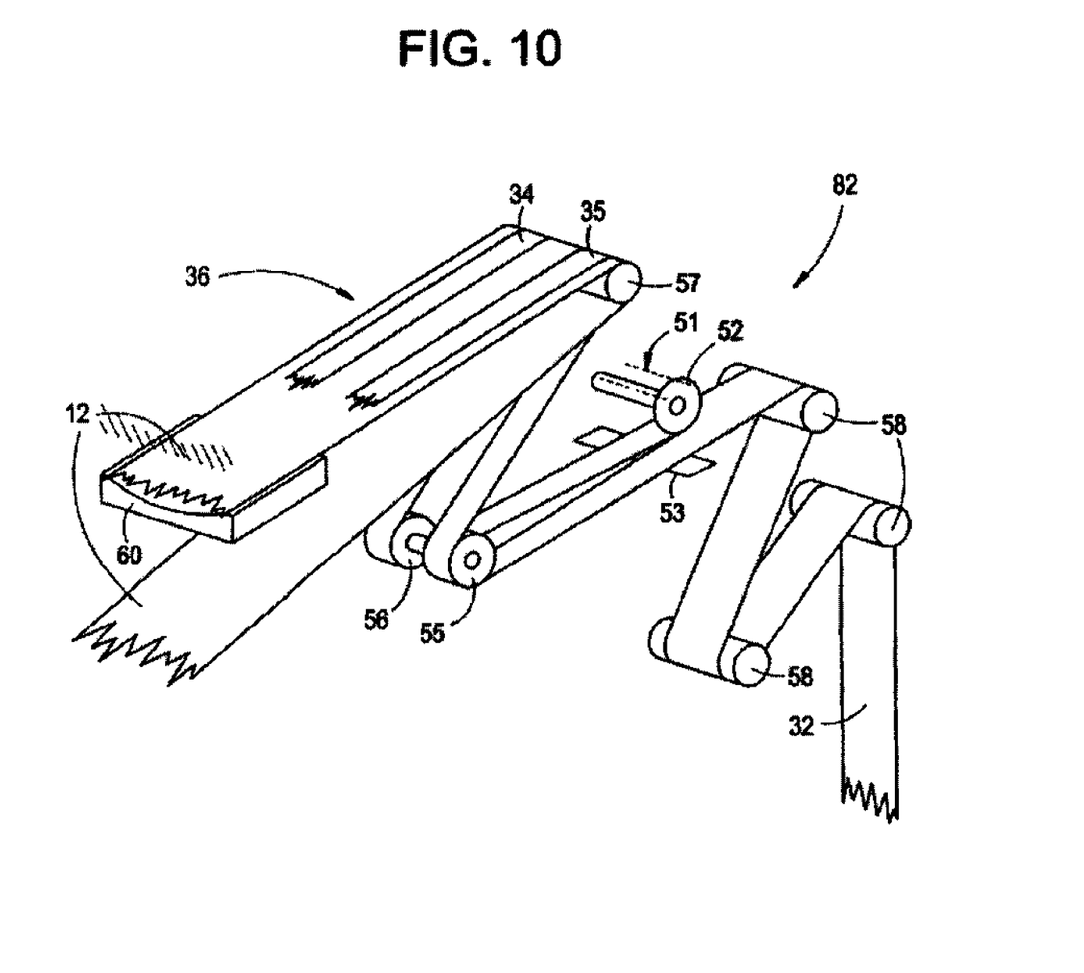
FIG. 10 is a perspective view of an alternative embodiment of the cigarette wapper formation point of a cigarette making machine for use with the present invention; and, FIG. 11 is a side view of an alternative embodiment for formation of the cigarette wrapper for use with the present invention.

Turning to FIG. 10, an alternative embodiment for the paper feeding assembly 82 is shown. In this embodiment, the outer wrap 12 is fed from a standard position to bullet roller 57 which directs the cigarette wrappers to the garniture 60 for formation of the cigarette. In this instance, the outer wrap 12 may be standard 27 mm wide cigarette paper and have normal porosity as well as other typical additives. As is depicted, the combined partial double wrap 36 which may be combined prior to the garniture is formed from the combination of the outer wrap 12 and the dual line inner wrap strips 34, 35. As can be seen, the inner wrap strip paper 32 from the bobbin is fed to the guide rollers 58 prior to cutting or slitting by rotary cutter 51. The rotary cutter may be comprised of a rotary knife 52 and knife block 53. In such a formation, it is desirable to have a 8 mm wide combined portion of the interior of the cigarette covered with the partial double inner wrap, an inner wrap 32 may be provided which is slit in half forming equal 4 mm wide strips 34, 35. These strips may be formed by rotary cutter 51 and separated by separation rollers 55, 56 before the partial inner wrap strip 34, 35 are combined with the outer wrap paper 12 at the roller 57. The inner wrap 32 of course may be slit into even narrower strips for overlaying onto the outer wrap.

A benefit of such a design is that a rotary cutter 51 may be provided for slitting the paper into the desired widths. Problematic in handling narrow strips thereby necessitating the guide and tensioning rollers is that after the narrower strips are formed, care must be provided to prevent tearing of the inner wrap paper 32 and individual strips 34, 35. Thus, it may be beneficial to provide a rotary cutter 51 at a point which is fairly close or adjacent to the garniture 60 in order to prevent significant handling of the narrow inner wrap strips 34, 35.

In the paper feeding assembly 82 shown in FIG. 10, a rotary cutter 51 is shown to form the strips 34, 35 from the original web of material 32. A number of different cutting devices or slitters may be used in all of these embodiments such as a static knife, laser, rotary knife as depicted, water jet cutter, kiss cutting or micro-perforation formation. Additionally, pre-formed webs of material may be provided which are pre-cut into individual strips which may then be separated prior to feeding into the garniture through various handling devices. A number of differing embodiments may be utilized in order to feed the appropriate inner wrap strips into the garniture in combination with the outer wrap. While the various embodiments disclosed herein teach specific structure to accomplish the feeding of the inner wrap strips to the garniture, a number of embodiments may be provided for formation or supplying of the inner wrap strips to the garniture in combination with the outer wrap. Such variations are felt to fall within the teachings of the present application and no unnecessary limitation is to be interpreted from the specific examples of the paper feeding assembly set forth herein.

Figure 11:
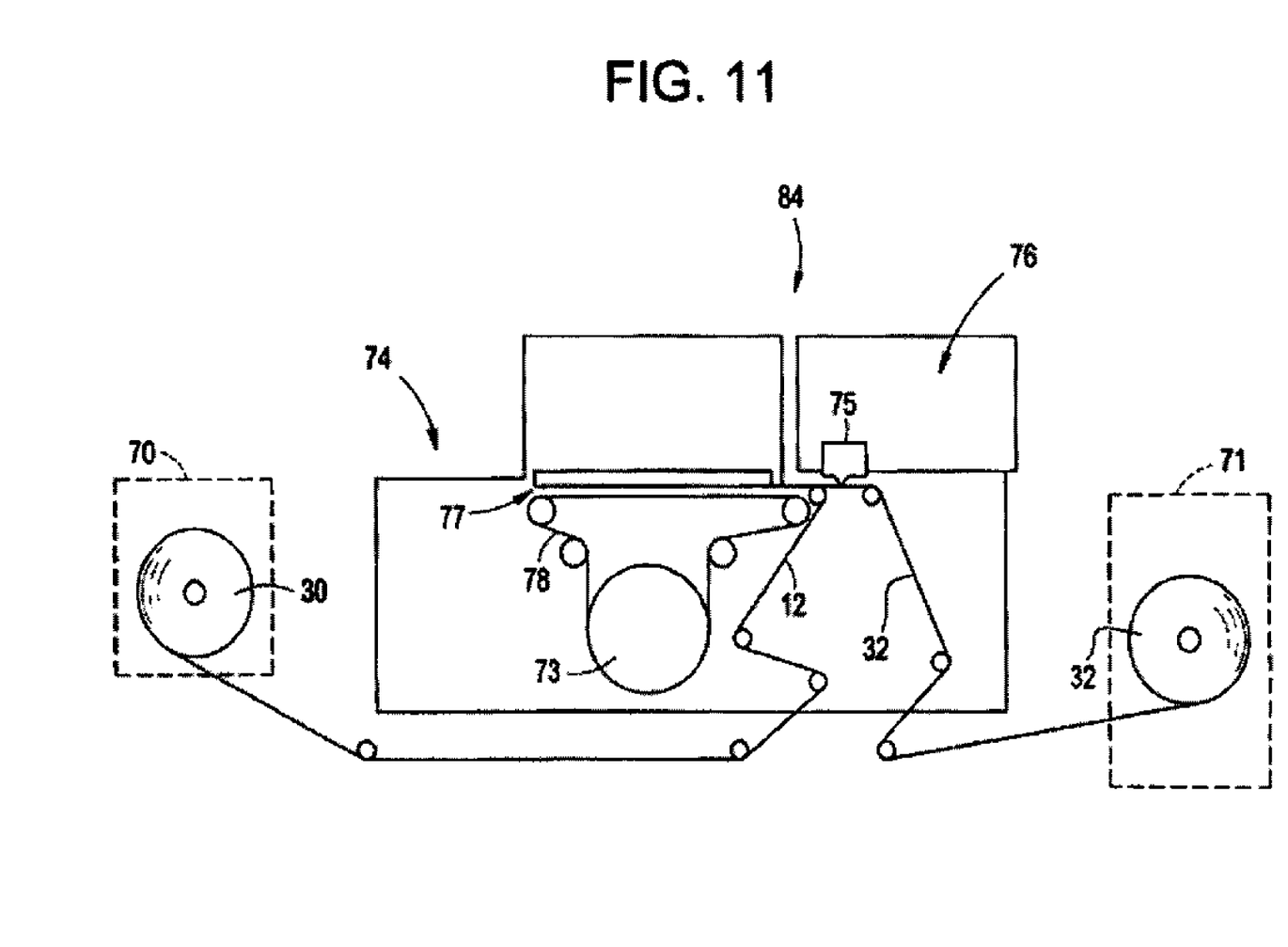

As disclosed in FIG. 11, an additional embodiment 84 is provided wherein a cigarette maker 74 may have external bobbin units 70, 71. External bobbin unit 70 may have bobbin 30 which supplies the outer wrap paper to be fed into the garniture 77. The bobbin 30 provides a web of material 12 which is fed into the garniture and combined with a web of material 32 which forms the inner wrap strips. External bobbin unit 71 may have a bobbin of material 32 which is fed to a knife mechanism 75 for slitting. The slitter or cutting mechanism 75 is positioned directly adjacent to the garniture 77 in order to decrease the length of handling of the individual narrow inner wrap strips. As shown, the maker 74 has garniture 77 and garniture belt 78 driven by drive shaft 73 which feeds the paper and tobacco material through the garniture during the cigarette formation process such that the tobacco rod and cigarette is formed with the inner wrap strips formed therein.

As may be appreciated, provision for an external bobbin unit 70, 71 for both the outer wrap and inner wrap material allows for easier online processing of the paper and ready integration into the cigarette maker 74 of the partial inner wrap strips. Additionally, external placement of the outer wrap bobbin 30 and inner wrap bobbin 32 requires minimal changing of the structure for the cigarette maker 74 as the bobbins may be spaced away from the maker 74 and no significant changes are required at the area around the garniture 77 apart from the guide and tensioning rollers. Additionally, external bobbin units are currently implemented with cigarette makers and may be provided for in order to combine the outer and partial inner wrap strips of the present invention in order to create the appropriate burn rate modification desired.

In use, the external unit 71 may be fitted with a spool of bandcast material instead of a standard bobbin of cigarette wrapper. A spool may be utilized due to the non-uniformity of the material in bandcast. A spool having bandcast recon may be used wherein the material is 8 mm in width and is fed into the maker 74 through guide rollers in order to minimize movement of the bandcast material as the spool is unwound. The material may be slit immediately prior to joining with the outer wrap material at the bullet roller which is the roller typically found at the first or beginning part of the garniture. A plurality of guide rollers and tensioning rollers may be provided to properly feed the material to the garniture and combine it with the outer wrap material.

The cigarette with burn rate modification of the present invention may be designed with variations in outer wrap and inner wrap paper characteristics. As previously explained, standard outer wrap designs are such that the typical outer wrap has a linear laid out width of 27 mm and generally a porosity of between 15 and 80 CORESTA units. As is generally understood, significantly decreasing the outer wrap porosity changes the deliveries and linear burn rate of the cigarette. Modification of the standard burn rate for a normal or typical cigarette may be obtained through addition of a partial inner wrap to the cigarette. The partial inner wrap may be a single inner wrap portion or may be a plurality of inner wrap strips as shown in the various figures. The partial inner wrap may have paper characteristics with a significantly reduced porosity such that the inner wrap paper exhibits a porosity of less than 8 CORESTA units. If a single inner wrap strip is utilized, such as with band cast or other paper as previously described and depicted in FIG. 6, the inner wrap layer may have a width of between 2-15 mm. The porosity of the inner wrap layer may be adjusted from any where to 0 to 8 CORESTA units.

EXAMPLES

Several product examples were made using the construction of a partial strip wrap or partial inner wrap cigarette using the inventive techniques and construction described herein. In the examples, a control cigarette was used having no partial inner wrap strips which exhibited a linear burn rate of between 4.3-4.7 mm/min. Different materials where utilized, as detailed in the chart below, for the partial inner wrap strips ranging from standard treated paper to band cast tobacco material.

Examples of cigarettes with two band cast inner wrap strips having a porosity of band cast material less than 5 CORESTA units:

| Cig. | Outer Wrapper Porosity CORESTA | Outer Wrap Citrate % | Inner Strips Number | Inner Strip Width mm | Linear Burn Rate (LBR) mm/min | Self Extinguishment % |
|---|---|---|---|---|---|---|
| 1 | 50 | 0.5 | 0 | 0 | 4.3 | 0 |
| 2 | 50 | 0.5 | 2 | 4 | 3.1 | 100 |
| 3 | 50 | 0.5 | 2 | 5 | 2.6 | 100 |
| 4 | 50 | 0.5 | 2 | 6 | 2.7 | 100 |
| 5 | 40 | 0.7 | 0 | 0 | 4.7 | 0 |
| 6 | 40 | 0.7 | 2 | 3 | 3.8 | 48 |
| 7 | 30 | 0.6 | 0 | 0 | 4.3 | 0 |
| 8 | 30 | 0.6 | 2 | 4 | 3.1 | 100 |

Examples of cigarettes with two cigarette paper strips treated or covered with sodium alginate having a porosity of inner strip paper less than 5 CORESTA units:

| Cig. | Outer Wrapper Porosity CORESTA | Outer Wrap Citrate % | Inner Strips Number | Inner Strip Width mm | Linear Burn Rate (LBR) mm/min | Self Extinguishment % |
|---|---|---|---|---|---|---|
| 9 | 70 | 0.6 | 0 | 0 | 4.4 | 0 |
| 10 | 70 | 0.6 | 2 | 2 | 3.8 | 25 |

Examples of cigarettes detailing smoke deliveries of two samples with band cast strips:

| Cig | Outer Wrapper Porosity CORESTA | Outer Wrap Citrate % | Inner Strip Number | Inner Strip Width mm | Linear Burn Rate (LBR) mm/min | Self Extinguishment On 10 layers % | tar mg/cig | Nicotine mg/cig | CO mg/cig | Puff Number |
|---|---|---|---|---|---|---|---|---|---|---|
| 11 | 70 | 0.6 | 2 | 4 | 3.9 | 90 | 15.5 | 1.4 | 12.2 | 10.3 |
| 12 | 50 | 0.5 | 2 | 4 | 3.8 | 90 | 14.5 | 0.9 | 14.6 | 7.3 |

In the examples presented, it is apparent that the addition of the partial inner wrap to the cigarette had a definite impact on linear burn rate and self extinguishment as compared to the control cigarette. The linear burn rate for the cigarettes using the present invention was directly affected and evidenced a reduction in linear burn rate by up to 40 percent. Where inner wrap strips were utilized having a width of at least 4 mm, all test samples self extinguished. Narrower width strips had differing results which could be modified by using alternative additives or increasing the number of strips. References to the self-extinguishment of the cigarette is related to the NIST test for flammability using 10 layers of filter paper.

Smoking Article Including Strips of Bandcast Reconstituted Tobacco

The separate partial inner wrap strips 14 may be strips of bandcast reconstituted tobacco made in accordance with the specific formula and process for making same as discussed hereinafter. The outer wrap cigarette paper 12 may be a normal porosity paper which typically exhibits a porosity of 15-80 CORESTA units. As shown, two strips 14 of a reconstituted tobacco sheet are provided on opposite sides of the tobacco column 13 to provide a partial inner wrap layer. The partial inner wrap layer including the reconstituted tobacco strips 14 may extend substantially the length of and be coaxial with the tobacco column 13. In one embodiment, the strips are placed equidistant from each other such that the resulting cigarette burns evenly.

Preparation of a Bandcast Reconstituted Tobacco Sheet

In the preparation of a bandcast reconstituted tobacco sheet for use in a cigarette, wood pulp, and a binder, such as sodium alginate, and ground tobacco particles or concentrated extract are slowly added to a tank containing water therein, the materials added while mixing under high shear insuring that each component is thoroughly dissolved or dispersed in the slurry. Particularly, it is desirable to add in order, wood pulp, tobacco and then alginate. Glycerin may also be added for sheet pliability and is generally added after the alginate and before any additional flavorant. Moreover, in a preferred slurry, a desired flavoring may also be added, one particularly desired flavoring being menthol. Inert fillers, such as calcium carbonate and the like, may also be added to the slurry. It has been found that the ratio of tobacco to alginate is preferably about 4.0 to 1.0 in order to obtain sheets with adequate tensile strength to withstand cigarette making machine forces. The resulting slurry is spread thinly on a casting surface, such as a stainless steel band, that is heated to approximately 200° F. The slurry spread remains on the heated belt until the resulting sheet is dry enough to be removed intact from the belt. The resulting bandcast sheet may be used immediately or conditioned at 100° F. in low humidity for 24 hours or more to further "seal in" any flavoring additives, such as menthol. The sheet may then be shredded and added to a tobacco blend or cut into elongated strips of a desired width and used as longitudinally extending strips along the outer periphery of a tobacco rod and the inner surface of an outer paper wrap. Smoking articles using these inner strips of reconstituted tobacco including menthol therein maintain their menthol flavor in open packs for significant periods of time up to 1 month. In sealed packs, they maintain their menthol flavor for at least 4 months.

In an embodiment, the tobacco blend is from 30 to 80% by weight; the wood pulp is from about 5 to 40% by weight; the binder is from 8 to 40% by weight and if a flavoring is added, such as menthol, the flavoring will be up to 30% by weight. Preferably, the tobacco will be approximately 26% by weight, the wood pulp will be approximately 13.5% by weight, the binder will be approximately 27% by weight, and menthol will be approximately 20% by weight. The total mix (i.e., the solid mixture) will be from about 2% to about 10% by weight in the slurry formulation. The binder can be alginate (e.g., sodium alginate), guar, xanthum, acacia, pectin, other gums, modified cellulose compounds, and hydrocolloid compounds. A humectant can be added, which can be glycerin or propylene glycol. The tobacco blend may be comprised of at least about 30% by weight of burley and up to about 30% by weight of a second tobacco. The second tobacco type may be flue-cured, oriental, Maryland, exotic types, and combinations thereof. The exotic tobaccos include, but are not limited to, Izmar, Samsun, Yaka, Latakia, Perique, Cavendish, Rustica, Fire-cure, and Dark or Sun-cure.

A more comprehensive understanding of the invention can be obtained by considering the following examples. However, it should be understood that the examples are not intended to be unduly limitative of the invention.

The following examples demonstrate the procedure that was followed in preparing a bandcast reconstituted tobacco sheet for use in a smoking article.

Example 1

In the process of making the bandcast reconstituted tobacco sheet, 130 gallons of water is put into a first vessel having a high shear agitator therein. While the water is being agitated, 35 pounds of wood pulp is added and thoroughly dispersed, 70 pounds of tobacco is added and thoroughly dispersed, 70 pounds of sodium alginate is added and thoroughly dispersed, 35 pounds of glycerin is added and thoroughly dispersed. In a separate tank, 52.5 pounds of menthol is added to 15 gallons of water at 40° C.; the mixture is agitated until the menthol is melted. The resulting mixture is added to the alginate slurry and thoroughly dispersed. More water is added to keep the viscosity between 10,000 to 20,000 centipoise, preferably 15,000 centipoise to ensure proper casting.

The slurry is then cast onto a stainless steel band which is maintained at approximately 200° F. at a thickness of about 40-60 mils. The sheet remains on the stainless steel belt until dry, which is approximately 6-8 minutes. The resulting mentholated bandcast sheet is maintained in sheet form until cut into strips for use in a cigarette article.

Cigarette articles having elongate strips of the bandcast reconstituted sheet disposed between the paper wrapper and the outer surface of the tobacco rod have been found to retain their menthol flavor for 1 month in open packs. In sealed packs, the cigarette articles retain their menthol flavor for at least 4 months and maybe up to a year.

It is to be understood that the invention is not to be limited to the specific examples shown as the parameters set forth in the examples may be varied by appropriate changes of the amounts of the constituents within the reconstituted bandcast tobacco sheet mix used in the examples.

Preparation of Burley Reconstituted Tobacco Sheet and Split Inner Wrap Strips

Generally, the preparation of burley bandcast reconstituted tobacco sheet and split inner wrap strips follows the preparation of bandcast reconstituted tobacco sheet and split inner wrap strips as previously described, with minor modifications. Note that, present in the tobacco blend are burley and a second tobacco type. A first tobacco, preferably burley, is at least about 30% by weight of the tobacco blend and a second tobacco, such as flue-cured, oriental, Maryland, rare and exotic tobaccos, and combinations thereof, is up to about 30% by weight of the tobacco blend. Exotic tobaccos include, but are not limited to, Izmar, Samsun, Yaka, Latakia, Perique, Cavendish, Rustica, Fire-cure, and Dark or Sun-cure.

Example 2

In making a paper reconstituted tobacco sheet, tobacco fines, dust, veins, stems, scraps, cut lamina, shredded stems, or combinations thereof, are mixed with an aqueous solvent. This starting material would be comprised of between about 30% and 100% by weight of burley tobacco. One part tobacco is added to 11-20 parts of the aqueous solvent, and extracted at 160° F. (70° C.) for 30 minutes. The mixture is separated via centrifugation, filtration, or pressing into a water soluble extract and a solid/fibrous non-water soluble component.

The extract is concentrated by vacuum evaporation or freeze dried and a humectant, such as glycerin, is added and mixed thoroughly. The extract may optionally be treated with adsorbents to selectively remove undesirable components, such as TSNAs, polyphenols, and proteins, and subsequently centrifuged. The adsorbents are discarded and the remaining extract is concentrated, and mixed with a humectant. An alginate binder may then be added to the extract.

The solid/fibrous component is refined and mixed with over 10% wood fibers that have been refined to a pulp in an earlier process. The fiber/pulp mixture is then used to make sheets via the paper process. The extract prepared as previously described is reapplied to the sheet. The sheet is slit and wound onto a bobbin, thereby forming burley paper reconstituted tobacco split inner wrap strips.

Another sheet making option of the invention can be obtained by considering the following example. However, it should be understood that the examples are not intended to be unduly limitative of the invention. The following example demonstrates the procedure that was followed in preparing a burley bandcast reconstituted tobacco sheet for use in a smoking article Example 3

Bandcast reconstituted tobacco was produced by mixing one part tobacco and other solids to 10-11 parts of water as shown in the recipe table:

| Materials Tobacco fines, dust, or concentrated extract | Bandcast Recipes (%) | | | | |
|---|---|---|---|---|---|
| | Burley | Cooked[c] (Burley/Flue) | Exotic I | Exotic II | Exotic III |
| Burley | 65 | 43 | 32.5 | 20 | 24.5 |
| Flue cure | 0 | 29 | 13.5 | 25 | 30 |
| Oriental | | | | | |
| Izmir | 0 | 0 | 5 | 3 | 0 |
| Samsun | 0 | 0 | 5 | 3 | 0 |
| Maryland | 0 | 0 | 0 | 14 | 0 |
| Fire-cure | 0 | 0 | 0 | 0 | 10 |
| Cavendish | 0 | 0 | 9 | 0 | 5 |
| Total Tobacco | 65 | 72 | 65 | 65 | 65 |
| Binder: | 7.5 | 5 | 7 | 7 | 9 |
| CMC[a] | 7.5 | 5 | 7 | 7 | 6 |
| Na-alginate[b] | | | | | |
| Wood pulp | 8 | 6 | 9 | 9 | 8 |
| Glycerin | 11 | 11 | 12 | 12 | 12 |
| Water | 10-11 times solids weight | 10-11 times solids weight | 10-11 times solids weight | 10-11 times solids weight | 10-11 times solids weight |
| Caustic (KOH, NaOH) | | 1.75% (tobacco weight) | | | |

[a]Carboxymethyl cellulose from TIC Gums (15 K)
[b]Kelvis from ISP Alginates Co.
[c]Cooking releases pectins, thereby making a stronger tobacco sheet and reducing the amount of binder needed The solids and water were sequentially mixed as follows: water, tobacco, and wood pulp were thoroughly mixed for 10 minutes. The binder (CMC and Na-alginate) and the remaining portion of water were mixed separately for 10 minutes, and then added to the water/tobacco/pulp mixture. Glycerin was subsequently added and mixed thoroughly for another 10 minutes. The mixture was then cast into a continuous sheet on a moving steel belt, passed through a drying tunnel, reconditioned to 10-12% moisture, and finally wound on a bobbin. The sheet on the bobbin was subsequently slit into an 8 mm wide spool and transversely wound on another bobbin. A commercial strip blend containing 35% burley was used to make control cigarette samples with no burley reconstituted inner wrap strips. A similar strip blend, containing 15% burley, was used to make test cigarettes via burley reconstituted inner wrap strips. For the test samples, each 8 mm reconstituted tobacco spool was further spliced into two 4 mm halves before entering the cigarette maker. Each final cigarette contained two 2×4 mm inserts lying adjacent to each other on the periphery of the tobacco section of the rod and within the cigarette paper. Other bandcast variants, Exotic I, Exotic II, and Exotic III were similarly prepared as outlined above, except that each of their recipes (refer to recipe table above) contained exotic tobaccos in addition to burley.

Example 4

Another burley bandcast reconstituted tobacco sheet for split inner wraps was similarly made as described in Example 2, except that the water-tobacco-wood pulp slurry was cooked with 1.75% (dry weight basis) tobacco equivalent of caustic (KOH) for 30 to 45 minutes at 70° C. to 90° C. Tobacco cooking with caustic results in the release of pectin, a natural binder. Pectin increases sheet tensile strength, and reduces the amount of binder used in the formulation.

Seven samples were made as follows:
1. A commercial LTS KS strip blend control with no insert,
2. LTS KS with two 2×4 mm burley paper insert,
3. LTS KS with two 2×4 mm burley bandcast insert,
4. LTS KS with two 2×4 mm cooked burley bandcast insert,
5. LTS KS with two 2×4 mm Exotic I blend bandcast insert,
6. LTS KS with two 2×4 mm Exotic II blend bandcast insert, and
7. LTS KS with two 2×4 mm Exotic III blend bandcast insert.
LTS refers to "lights" and KS refers to "king size." The cigarettes were aged in packs in cartons for three weeks at 70° F. and 65% relative humidity, and submitted for sensory and routine testing.

The following table shows a smoke panel rating of 34 to 37 panelists for the commercial LTS KS strip blend control with no insert (1) versus the LTS with burley paper (2), burley bandcast (3), cooked burley bandcast (4), Exotic I blend (5), Exotic II blend (6), and Exotic III blend (7) reconstituted tobacco inserts, as described in the recipe table and referenced above:

| Smoke attributes | 1 | 2 | 1 | 3 | 1 | 4 |
|---|---|---|---|---|---|---|
| More impact | 20 | 15 | 19 | 16 | 14 | 22** |
| More irritation | 21 | 14 | 18 | 17 | 17 | 19 |
| More mouthful of smoke | 17 | 18 | 17 | 18 | 11 | 24*** |
| More tobacco taste | 14 | 21** | 14 | 21** | 15 | 21** |
| Better tobacco taste | 14 | 21** | 14 | 21** | 17 | 19 |
| Off taste | 1 | 0 | 0 | 1 | 1 | 1 |
| Coal fall out | 0 | 0 | 0 | 0 | 0 | 0 |
| | Number of panelists = 35 | | Number of panelists = 35 | | Number of panelists = 36 | |
| | Sign @ 95% CL = 23*** | | Sign @ 95% CL = 23*** | | Sign @ 95% CL = 20*** | |
| | Sign @ 80% CL = 21** | | Sign @ 80% CL = 21** | | Sign @ 80% CL = 17** | |

| Smoke attributes | 1 | 5 | 1 | 6 | 1 | 7 |
|---|---|---|---|---|---|---|
| More impact | 14 | 23** | 13 | 23** | 12 | 22** |
| More irritation | 21 | 16 | 15 | 21** | 16 | 18 |
| More mouthful of smoke | 14 | 23** | 14 | 22** | 11 | 23*** |
| More tobacco taste | 15 | 22** | 10 | 26*** | 13 | 21** |
| Better tobacco taste | 16 | 21 | 14 | 22** | 15 | 19 |
| Off taste | 3 | 3 | 4 | 1 | 2 | 2 |
| Coal fall out | 1 | 1 | 0 | 0 | 0 | 0 |
| | Number of panelists = 37 | | Number of panelists = 36 | | Number of panelists = 34 | |
| | Sign @ 95% CL = 24*** | | Sign @ 95% CL = 24*** | | Sign @ 95% CL = 23*** | |
| | Sign @ 80% CL = 22** | | Sign @ 80% CL = 21** | | Sign @ 80% CL = 21** | |

As can be seen from the above tables, the cigarettes with inserts were found to have a "more and better tobacco taste" than the control with no insert, despite the control having the highest tar/puff ratio, as shown in the following table:

| Routine analyticals (FTC method) and TSNAs | Commercial LTSa KSb Control with no insert | LTS with | | | | | |
|---|---|---|---|---|---|---|---|
| | | Burley paper inserts | Burley band cast inserts | Cooked burley band cast inserts | Exotic tobacco I band cast inserts | Exotic tobacco II band cast inserts | Exotic tobacco III band cast inserts |
| Puff number | 7.2 | 8.1 | 8.2 | 8.6 | 8.3 | 8.2 | 8.3 |
| Tar (mg/cig) | 10.9 | 10.4 | 10.9 | 11.3 | 10.7 | 10.9 | 10.5 |
| Nicotine (mg/cig) | 0.92 | 0.86 | 0.89 | 0.9 | 0.9 | 0.89 | 0.88 |
| Tobacco weight (mg) | 1019.0 | 970.0 | 977.0 | 989.0 | 979.0 | 980.0 | 978.0 |
| CO (mg/cig) | 9.2 | 10.3 | 10.4 | 10.5 | 9.9 | 9.8 | 9.5 |
| Tar/puff | 1.5 | 1.3 | 1.3 | 1.3 | 1.3 | 1.3 | 1.3 |
| Nitrosamines | | | | | | | |
| NAB | 8.0 | 4.9 | 4.4 | BDL | BDL | BDL | BDL |
| NAT | 141.1 | 97.9 | 22.1 | 15.4 | 16.2 | 24.6 | 36.7 |
| NNK | 20.7 | 13.2 | 14.3 | 7.1 | 9.3 | 8.7 | 16.0 |
| NNN | 184.2 | 130.8 | 22.9 | 13.3 | 13.6 | 24.7 | 37.5 |
| Total TSNAs | 354.0 | 246.8 | 63.6 | 38.8 | 41.3 | 60.8 | 93.8 |

Smoking Article Including Burley Bandcast
Reconstituted Tobacco Split Inner Wrap Strips The separate partial inner wrap strips 14 may be strips of bandcast, paper, or extruded reconstituted tobacco made in accordance with the specific formula and process for making same previously discussed. The outer wrap cigarette paper 12 may be a normal porosity paper which typically exhibits a porosity of 15-80 CORESTA units. As shown, two strips 14a, 14b of a reconstituted tobacco sheet are provided on opposite sides of the tobacco column 13 to provide a partial inner wrap layer. The partial inner wrap layer including the burley reconstituted tobacco strips 14a, 14b may extend substantially the length of and be co-axial with the tobacco column 13. In one embodiment, the strips 14a, 14b are placed equidistant from each other such that the resulting cigarette burns evenly.

The foregoing detailed description is given primarily for clearness of understanding and no unnecessary limitations are to be understood therefrom, for modifications will become obvious to those skilled in the art upon reading this disclosure, and may be made without departing from the spirit of the invention and scope of the appended claims.

What is claimed is:

1. A menthol cigarette which maintains its menthol flavor for an extended period of time comprising:
    a tobacco column surrounded by an outer wrap paper; and,
    a partial inner wrap material extending longitudinally of said tobacco column and disposed between said outer wrap and said tobacco column, said partial inner wrap material being one or more strips of a bandcast tobacco sheet which consists essentially of from about 5% to about 40% by weight of wood pulp, from about 8% to about 40% by weight of binder, and from about 30% to about 80% by weight of tobacco blend and about 20% to about 30% by weight of melted menthol thoroughly dispersed therein, wherein said tobacco blend also consists essentially of burley and a second tobacco, said burley being at least about 30% by weight of said partial inner wrap material, and said second tobacco being up to about 30% by weight of said partial inner wrap material.

2. The cigarette of claim 1, wherein said second tobacco is selected from the group consisting of flue-cured tobacco, oriental tobacco, Maryland tobacco, exotic tobacco, and combinations thereof.

3. The cigarette of claim 2, wherein said exotic tobacco is selected from the group consisting of Izmar tobacco, Samsun tobacco, Yaka tobacco, Latakia tobacco, Perique tobacco, Cavendish tobacco, Rustica tobacco, Fire-cure tobacco, Dark or Sun-cure tobacco, and combinations thereof.

4. The cigarette of claim 1, including up to about 30% by weight of a humectant in said inner wrap.

5. The cigarette of claim 4, said humectant selected from the group consisting of glycerin and propylene glycol.

6. The cigarette of claim 5, said glycerin being approximately 13.5% by weight of said inner wrap.

7. The cigarette of claim 1, said binder selected from the group consisting of alginate, guar, xanthum, acacia, pectin, other gums, modified cellulose compounds, and hydrocolloid compounds.

8. The cigarette of claim 7, said alginate being sodium alginate.

9. The cigarette of claim 8, said sodium alginate being about 27% by weight of said inner wrap.

10. The cigarette of claim 1, said tobacco blend and said binder respectively being in a ratio of from about 4.0 to 1.0 to about 1.0 to 1.0.

* * * * *